United States Patent
Zhang et al.

(10) Patent No.: US 12,019,645 B2
(45) Date of Patent: Jun. 25, 2024

(54) RECORD MANAGEMENT IN TIME SERIES DATABASE

(71) Applicant: INTERNATIONAL BUSINESS MACHINES CORPORATION, Armonk, NY (US)

(72) Inventors: Huai Long Zhang, BeiJing (CN); Peng Hui Jiang, Beijing (CN); Xing Xing Shen, Beijing (CN); Ming Lei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 17/812,527

(22) Filed: Jul. 14, 2022

(65) Prior Publication Data
US 2024/0020312 A1    Jan. 18, 2024

(51) Int. Cl.
*G06F 16/00* (2019.01)
*G06F 16/2458* (2019.01)
(Continued)

(52) U.S. Cl.
CPC ........ *G06F 16/2474* (2019.01); *G06F 16/285* (2019.01); *G06F 40/242* (2020.01)

(58) Field of Classification Search
CPC .... G06F 16/2428; G06F 16/248; G06F 16/26; G06F 16/283; G06F 16/1834; G06F 16/24534; G06F 16/285; G06F 18/2411; G06F 7/14; G06F 11/0793; G06F 11/3003; G06F 11/324; G06F 16/245; G06F 11/0772; G06F 11/079; G06F 11/3006; G06F 16/172; G06F 16/215; G06F 16/957; G06F 18/2155; G06F 18/2415; G06F 18/24765; G06F 9/5072; G06F 1/26; G06F 16/2358; G06F 16/2365; G06F 16/2474; G06F 16/355; G06F 17/18; G06F 40/20; G06F 40/242; G06F 40/279; H04L 43/08; C12M 23/22; C12M 41/48;
(Continued)

(56) References Cited

U.S. PATENT DOCUMENTS 7,430,640 B2    9/2008  Schmuck
9,286,006 B2    3/2016  Lewis
(Continued)

OTHER PUBLICATIONS

"How to use TAGs efficiently with Datasentinel", Datasentinel, Sep. 30, 2020, 4 pages, <https://www.datasentinel.io/blog/post/tags/>.
(Continued)

*Primary Examiner* — Shyue Jiunn Hwa
(74) *Attorney, Agent, or Firm* — Gavin Giraud

(57) ABSTRACT

Disclosed are a computer-implemented method, a system and a computer program product for record management in a time series database (TSDB). In the computer-implemented method for record management in a TSDB, time series records can be obtained from distributed sources by one or more processing units. The records can be divided into different record groups based on a timestamp of each of the records by one or more processing units. The records in each of the record groups can be normalized into normalized records by one or more processing units. The normalized records can be stored in the TSDB by one or more processing units.

20 Claims, 5 Drawing Sheets

(51) Int. Cl.
*G06F 16/28* (2019.01)
*G06F 40/242* (2020.01)

(58) Field of Classification Search
CPC .......... G06T 2207/20081; G06N 20/00; G06Q 10/063114
See application file for complete search history.

(56) References Cited

U.S. PATENT DOCUMENTS

| | | | |
|---|---|---|---|
| 10,521,747 B2 | 12/2019 | Warner | |
| 2013/0104022 A1 | 4/2013 | Coon | |
| 2014/0351217 A1* | 11/2014 | Bostock | G06F 16/128 707/639 |
| 2017/0270147 A1* | 9/2017 | Li | G06F 16/182 |
| 2020/0099614 A1* | 3/2020 | Vutharkar | G06F 7/14 |
| 2020/0356462 A1* | 11/2020 | Anand | G06F 11/3495 |
| 2022/0058745 A1* | 2/2022 | Crabtree | G06N 5/022 |

OTHER PUBLICATIONS

"Open TSDB-Writing Data", Programmer All, Printed Oct. 18, 2021, 17 pages, <https://www.programmerall.com/article/67741340698/>.

"Sensu-opentsdb-handler", Sensu, Feb. 18, 2020, 4 pages, <https://bonsai.sensu.io/assets/sensu/sensu-opentsdb-handler>.

Gupta, Deepak, "Introduction to Prometheus Monitoring", Opstree, Jul. 27, 2021, 9 pages, <https://blog.opstree.com/2021/07/27/introduction-to-prometheus-monitoring/>.

Rashid, Obaidur, "API Metrics with a Time Series Database", API Academy, Mar. 22, 2021, 7 pages, <https://apiacademy.co/2021/03/api-metrics-with-time-series-database/>.

Mell et al., "The NIST Definition of Cloud Computing", Recommendations of the National Institute of Standards and Technology, NIST Special Publication 800-145, Sep. 2011, 7 pages.

* cited by examiner

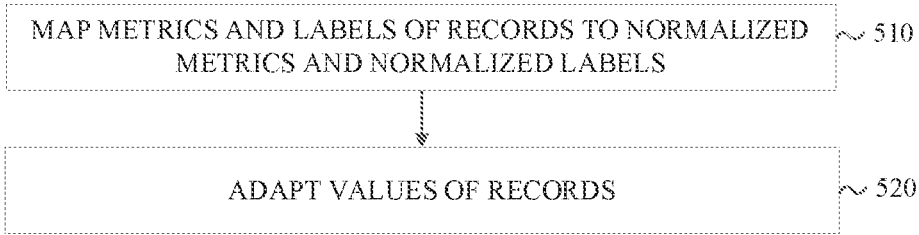

FIG. 5

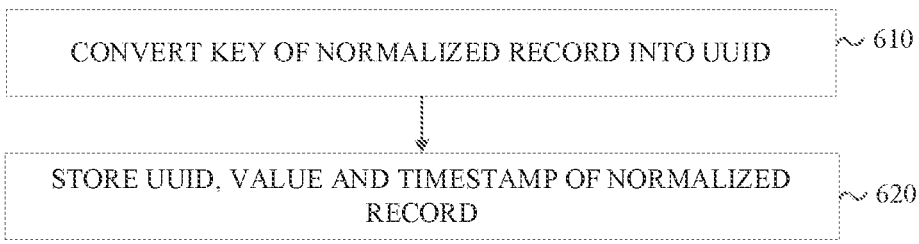

FIG. 6

| | |
|---|---|
| http_request_duration_milliseconds_bucket{method="post",le="100"} | Dc26692 |
| http_request_duration_milliseconds_bucket{method="post",le="300"} | A1c7b2d |
| http_request_duration_milliseconds_bucket{method="post",le="500"} | 909d323 |
| http_request_duration_milliseconds_bucket{method="post",le="750"} | 5078a23 |
| http_request_duration_milliseconds_bucket{method="post",le="1000"} | 2ab4de6 |
| http_request_duration_milliseconds_bucket{method="post",le="+Inf"} | 26cf3ba |
| http_request_duration_milliseconds_count{method="post"} | B8a610b |
| http_request_duration_milliseconds_sum{method="post"} | 5cfa1f35 |

FIG. 7

RECORD MANAGEMENT IN TIME SERIES DATABASE

BACKGROUND

The present disclosure relates to record management, and more specifically, to a computer-implemented method, a system and a computer program product for record management in a time series database (TSDB).

A TSDB is a database storing and managing time-stamped data which can be referred to as time series records or samples. Time series records can be measurements or events that are tracked or monitored over time, such as prices of a stock market, temperatures in an environment, CPU usages, etc. There are many TSDBs such as OpenTSDB, Prometheus and InfluxDB. The TSDBs have applications in various fields such as financial transaction systems, hardware monitoring systems and environment monitoring systems.

SUMMARY

According to one embodiment of the present disclosure, there is provided a computer-implemented method for record management in a TSDB. In this method, time series records can be obtained from distributed sources by one or more processing units. The records can be divided into different record groups based on a timestamp of each of the records by one or more processing units. The records in each of the record groups can be normalized into normalized records by one or more processing units. The normalized records can be stored in the TSDB by one or more processing units. This method provides the benefits of managing distributed metrics in the TSDB. The managed distributed metrics save mapping when encoding labels to generate uuid.

In certain embodiments, the method may include mapping metrics and labels of the records to normalized metrics and normalized labels based on mapping relationships among metrics and among labels stored in a dictionary and adapting values of the records based on the mapping of the metrics and the labels. Furthermore, the mapping relationships stored in the dictionary may include predefined mapping relationships. Certain embodiments of the present disclosure may also include updating the mapping relationships stored in the dictionary based on trend of values of the records. Mapping relationships can improve efficiency in managing and using distributed metrics.

In certain embodiments of the present disclosure, storing the normalized records in the TSDB may include storing only one of the normalized records with a same metric, a same label and a same value as a shared record.

In certain embodiments the method may include sorting the normalized records with a same metric and a same label in time sequence based on timestamps of the normalized records. The timestamps of the normalized records provide benefits for efficiently managing and using distributed metrics.

In certain embodiments of the present disclosure, any dividing of the records into different record groups may include any of grouping records with a same timestamp into a same record group, grouping records sampled at a same time interval into a same record group, or grouping records sampled at time intervals with a multiple relationship into a same record group.

In certain embodiments of the present disclosure, any storing of the normalized records in the TSDB may include converting a key of the normalized record into a universally unique identifier (uuid). The key may include a metric and a label of the normalized record. Storing of the normalized records may also include storing the uuid, a value, and a timestamp of the normalized record in the TSDB. Furthermore, the method may include storing a mapping relationship between the key and the uuid in the TSDB. The method may also include parsing a requested timestamp and a requested key with a requested metric and a requested label from a request for a time series record, converting the requested key into a requested uuid, and searching the requested time series record in the TSDB based on the requested uuid and the requested timestamp. The storing done this way can save mapping when encoding labels to generate uuid and then decode.

In certain embodiments of the present disclosure, a method may include parsing a requested timestamp and a requested key with a requested metric and a requested label from a request for a time series record, mapping the requested metric and the requested label into a normalized requested metric and a normalized requested label based on mapping relationships among metrics and among labels stored in a dictionary, converting the normalized requested metric and the normalized requested label into a requested uuid, and searching, the requested time series record in the TSDB based on the requested uuid and the requested timestamp.

The method may also include embodiments in which the obtaining of the records from distributed sources includes pulling the records from the distributed sources or getting the records pushed from the distributed sources. Obtaining the records in this manner can effectively manage distributed metrics in TSDBs.

According to another embodiment of the present disclosure, there is provided a system for record management in a TSDB. The system comprises one or more processors, a memory coupled to at least one of the processors and a set of computer program instructions stored in the memory. When executed by at least one of the processors, the set of computer program instructions perform following actions. Time series records can be obtained from distributed sources. The records can be divided into different record groups based on a timestamp of each of the records. The records in each of the record groups can be normalized into normalized records. The normalized records can be stored in the TSDB.

According to a yet another embodiment of the present disclosure, there is provided computer program product for record management in a TSDB. The computer program product comprises a computer readable storage medium having program instructions embodied therewith. The program instructions are executable by a processor to cause the processor to perform following actions. Time series records can be obtained from distributed sources. The records can be divided into different record groups based on a timestamp of each of the records. The records in each of the record groups can be normalized into normalized records. The normalized records can be stored in the TSDB.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 depicts exemplary procedures of a step in a method for record management according to an embodiment of the present disclosure.

FIG. 6 depicts exemplary procedures of another step in a method for record management according to an embodiment of the present disclosure.

FIG. 7 depicts an illustrative example of conversion from keys to uuids according to an embodiment of the present disclosure.

DETAILED DESCRIPTION

Figure 1:
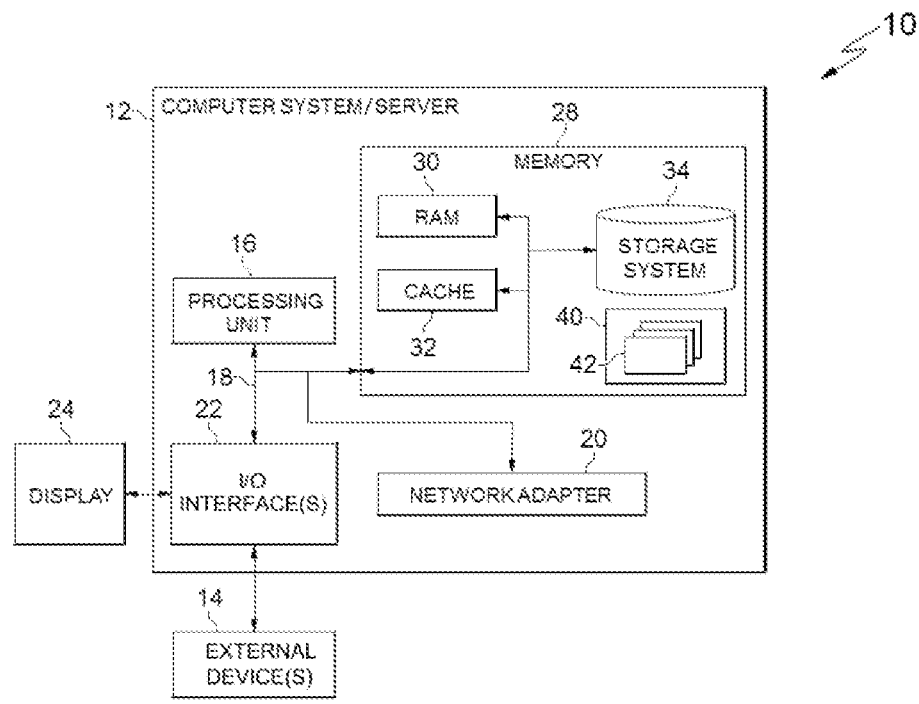
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although the present disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
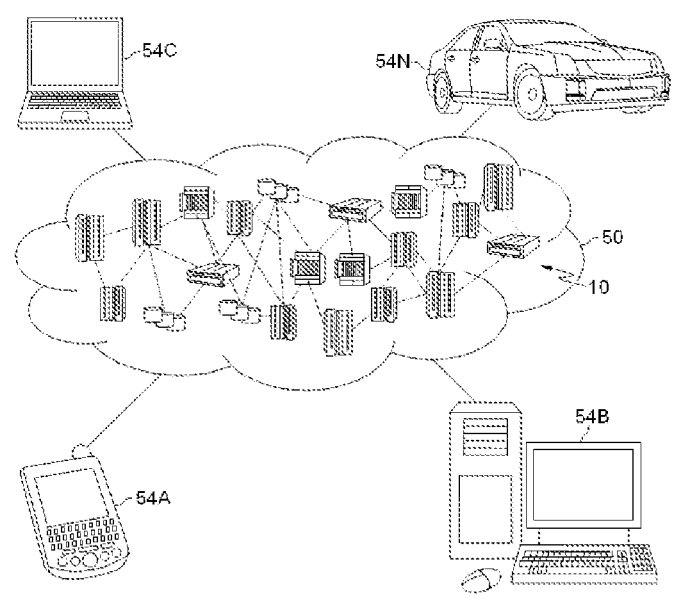
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
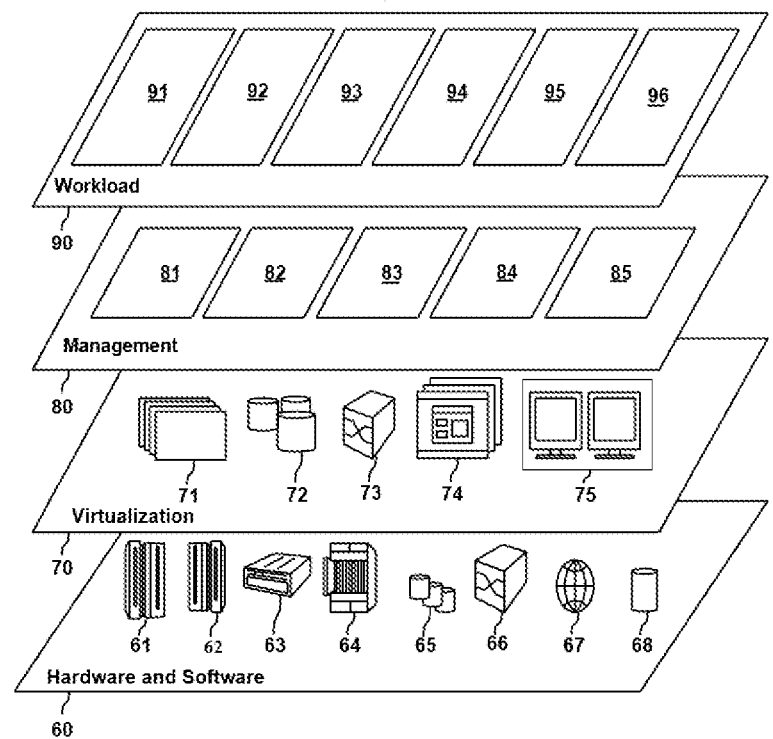
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and record management 96.

The functional abstraction layers in FIG. 3 are only for example. When necessary, one or more layers can be added thereto, and one or more layers in FIG. 3 can be merged or omitted. In addition, in each layer of FIG. 3, some components can be omitted or merged, and one or more components can be added.

A TSDB can store and manage time series records, and the time series records can be records with timestamps and collected from sampling sources. The format of a time series record can be: <key><timestamp><value>, which is a key-value pair with a timestamp. The key can consist of a metric reflecting an attribute of the record and a label reflecting dimensional characteristics of the metric, and can be expressed as <metric>{<label>}. The label may comprise one or more sub-labels, each of which consists of a sub-label name and a sub-label value. In this regard, the key can also be expressed as <metric>{<sub-label name1>=<sub-label value1>,<sub-label name2>=<sub-label value2> . . . }. For example, a key may be expressed as http_request_total{method='POST', status='200'}, which may represent a total number of http requests with a request type of POST and a response status of 200.

Four illustrative examples of time series records are shown below.
1 cpu_use{ip='10.27.120.7', id='3'} 948258276 14.5%
2 cpu_use{ip='10.27.120.7', id='3'} 948258286 14.0%
3 http_request_total{status='200', method='GET'} 948258296 94355
4 meterCurrent{device='d01', location='bj'} 948278275 10.2

For the first record, the key is cpu_use{ip='10.27.120.7', id='3'}, which consists of a metric cpu_use and a label {ip='10.27.120.7', id='3'}; the timestamp is 948258276; and the value is 14.5%. For the second record, the key is cpu_use{ip='10.27.120.7', id='3'}, the same as the first record, which means that the two records are directed to the same metric (i.e. CPU usage) for the same server or host (with an IP of 10.27.120.7 and an ID of 3); the timestamp is 948258286, and the value is 14.0%. For the third record, the key is http_request_total{status='200', method='GET'}, which consists of a metric http_request_total and a label {status='200', method='GET'}; the timestamp is 948258296; and the value is 94355. For the fourth record, the key is meterCurrent{device='d01', location='bj'}, which consists of a metric meterCurrent and a label {device='d01', location='bj'}; the timestamp is 948278275; and the value is 10.2.

Time series records may be sampled by various sampling sources on various targets, and some of the records from different sampling sources may represent the same attribute of the same sampled target. For example, multiple applications or servers running on one physical machine may separately sample records for attributes of the machine, such as CPU usage and IP address of the machine. Therefore, different sampling sources such as different applications and/or servers may sample records representing the same attribute such as the CPU usage and/or the IP address of the same sampled target such as the physical machine. As other examples, processes or threads of an application running on one physical machine may separately sample records for attributes of the application and/or the physical machine, and virtual machines on one host may separately sample records for attributes of the host. Therefore, there may be a large quantity of duplicate or redundant records, which would increase storage cost. On the other hand, the metrics and the labels of records from different sampling sources may be named differently. Therefore, the TSDB needs to store and manage records with all kinds of metrics and labels, leading to inefficient management and usage of the records.

Embodiments of the present disclosure aim to solve at least one of the technical problems described above, and propose a method, a system and computer program product for record management in a TSDB, enabling unification of the naming of the metrics and labels, and thus enabling efficient management and usage of the records in the TSDB.

Figure 4:
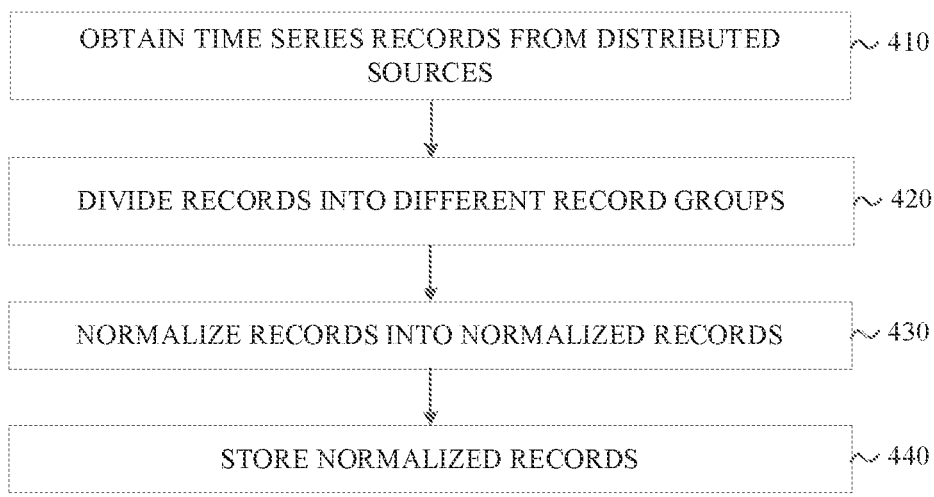
FIG. 4 depicts a flowchart of a method for record management in a TSDB according to an embodiment of the present disclosure.

Referring now to FIG. 4, it is shown a flowchart of a method 400 for record management in a TSDB according to an embodiment of the present disclosure. Method 400 can be implemented by one or more processing units, for example, implemented by computer system/server 12 of FIG. 1.

At step 410, time series records can be obtained from distributed sources. The distributed sources can be different applications, servers, processes, threads and/or virtual machines as described in the above. There can be various ways for the TSDB to obtain records. In some embodiments, step 410 can comprise at least one of pulling the records from the distributed sources and getting the records pushed from the distributed sources. For example, the records can be pulled from an application server or an API server, the records can be pushed by an exporter which is a data acquisition component in existing TSDBs, or the records can be pulled from a service discovery in existing TSDBs which dynamically discovers a target to be sampled or monitored.

At step 420, the records can be divided into different record groups based on a timestamp of each of the records. This is for the purpose of classifying records that may be related. The timestamp of a record can reflect the time that record is sampled, and the timestamps of multiple records with the same key and sampled by the same sampling source can reflect the sampling interval or the sampling rate. For example, if a record for a temperature of a city sampled by a first sampling source has a timestamp of 11:00 a.m. on one day, a subsequent record for the temperature of the city sampled by the first sampling source has a timestamp of 12:00 p.m. on that day, and a preceding record for the temperature of the city sampled by the first sampling source has a timestamp of 10:00 a.m. on that day, it can be derived that the sampling interval of the first sampling source for the temperature of the city is one hour. Records sampled at the same time or the same time interval may be related. For example, a record sampled by a first sampling source at a time interval of 1 hour and a record sampled by a second sampling source at a time interval of 1 hour may be related, as they may both be records for a temperature of a city. On the other hand, records sampled by different sampling sources and at different time or time intervals may be less related. For example, a record sampled by a first sampling source at a time interval of 10 minutes and a record sampled by a second sampling source at a time interval of 3 minute may not be related, as the former may be a record for number of clicks of a website and the latter may be a record for CPU usage. In addition, records sampled at a first time interval may be related to records sampled at a second time interval with a multiple relationship with the first time interval. For example, a record sampled by a first sampling source at a time interval of 5 minutes and a record sampled by a second sampling source at a time interval of 10 minutes, which is twice as long as the time interval of 5 minutes, may be related, as they may both be records for a voltage of an electric element. Accordingly, there may be various ways to divide the records into different record groups based on a timestamp of each of the records. For example, a first way is to group records with a same timestamp into a same record group, which can be directly done by referring to the timestamps of the records. A second way is to group records sampled at a same time interval into a same record group. For example, records sampled every 5 minutes from a first sampling source and records sampled every 5 minutes from a second sampling source can be grouped into a same record group. A third way is to group records sampled at time intervals with a multiple relationship into a same record group. For example, records sampled every 5 minutes from a first sampling source and records sampled every 15 minutes from a second sampling source can be grouped into a same record group. The time interval of 15 minutes has a triple relationship with the time interval of 5 minutes. For another example, records sampled every 5 minutes from a first sampling source, records sampled every 15 minutes from a second sampling source and, records sampled every 5 minutes from a third sampling source and records sampled every 60 minutes from a fourth sampling source can be grouped into a same record group.

At step 430, the records in each of the record groups can be normalized into normalized records. This step is aimed at unifying the naming of the metrics and the labels of the records. FIG. 5 shows a process of how to normalize the records in each of the record groups into normalized records according to an embodiment of the present disclosure.

According to embodiments of the present disclosure, mapping relationships among metrics and among labels can be stored in a dictionary in the TSDB, and the normalization can be done by using the mapping relationships. The dictionary can store mapping relationships indicating the correspondence between each normalized metric and its related unnormalized metric(s) and the correspondence between each normalized label and its related unnormalized label(s). Therefore, for each of the record groups, at step 510, metrics and labels of the records in that record group can be mapped to normalized metrics and normalized labels based on the mapping relationships among metrics and among labels stored in the dictionary. In other words, if the metric and the label of a record is different from its corresponding normalized metric and normalized label, the metric and the label will be transformed to its corresponding normalized metric and normalized label. For example, the dictionary may store a mapping relationship which indicates that a metric http-p_requests_total and a metric httprequest_total can be mapped to a normalized metric http_request_total, and thus both the metric http_requests_total and the metric httprequest_total can be mapped to the normalized metric http_request_total based on the mapping relationship. For another example, the dictionary may store a mapping relationship which indicates that a metric temperature_Fahrenheit can be mapped to a normalized metric temperature_Celsius, and thus the metric temperature_Fahrenheit can be mapped to the normalized metric temperature_Celsius based on the mapping relationship.

After the mapping of metrics and labels of the records, at step 520, values of the records can be adapted based on the mapping of the metrics and the labels. For instance, in the above example of mapping the metric temperature_Fahrenheit to a normalized metric temperature_Celsius, values of the corresponding records need to be converted based on the equation of $C=(F-32)/1.8$, where C represents a value in Celsius and F represents a value in Fahrenheit. In another example, if the metrics or labels of the records are mapped from a representation form of decimal to a representation form of binary, the values also need to be converted accordingly.

In some embodiments, the mapping relationships stored in the dictionary can comprise predefined mapping relationships. The predefined mapping relationships can be generated based on knowledge of known naming conventions. In some embodiments, the mapping relationships stored in the dictionary can be updated based on trend of values of the obtained records. If values of a first set of records with a first key have a similar trend (i.e., variation with time) to values of a second set of records with a second key, the first key and the second key are probably different expressions of the same meaning. Therefore, by observing trend of values of the records, different naming conventions of metrics and labels with the same meaning can be detected and added into the dictionary. Accordingly, a mapping relationship between the metric of the first key and the metric of the second key, and a mapping relationship between the label of the first key and the label of the second key, can be added into the dictionary. It should be noted that updating the mapping relationships stored in the dictionary also comprises building the dictionary from scratch, without predefined mapping relationships stored therein. The updating of the mapping relationships can be performed before step 430.

After the normalization at step 430, metrics with different representation forms but with the same meaning can be unified to a normalized metric, and labels with different representation forms but with the same meaning can be unified to a normalized label, which greatly reduces the number of metrics and labels that should be managed in the TSDB. Then, at step 440, the normalized records can be stored in the TSDB.

After the normalization, it is possible to identify duplicate or redundant records which have a same metric, a same label and a same value. As described above, there may be a large quantity of duplicate or redundant records. In order to save storage space, the duplicate or redundant records can be stored only in one copy. As such, in some embodiments, step 440 can comprise storing only one of the normalized records with a same metric, a same label and a same value as a shared record, so that the need for storage space can be decreased.

In some embodiments, in order to decrease the need for storage space, instead of storing the metric and the label of a normalized record, a universally unique identifier (uuid) converted from the metric and the label can be stored. The metric and the label are usually in the format of long strings, and the uuid can be much shorter. FIG. 6 shows a process of how to store the normalized records in the TSDB according to an embodiment of the present disclosure. For each of the normalized records, at step 610, a key of the normalized record can be converted into a uuid. The key of the normalized record can comprise a metric and a label of the normalized record, as described above. As an example, a hash function, such as Message-Digest Algorithm 5 (MD5) can be used for the conversion. As another example, a look-up table can be established in the TSDB for the conversion. FIG. 7 shows an illustrative example of the conversion from keys to uuids. As can be seen from FIG. 7, the long strings of the keys can be converted into much shorter format of representations. After the conversion, at step 620, the uuid, a value and a timestamp of the normalized record can be stored in the TSDB. In some embodiments, a mapping relationship between the key and the uuid can also be stored in the TSDB, so that it is possible to retrieve a key of a normalized record based on a certain uuid. Further, it is possible to retrieve normalized records based on uuids.

In some embodiments, in order to improve writing performance, step 440 can comprise using Log Structured Merge (LSM) Tree for storage.

In some embodiments, a user can access the TSDB, for example submit a request for a time series record. The request for a time series record can comprise a requested key of the requested record. The requested key can be converted to a requested uuid, and the requested uuid can be compared with the uuids stored in the TSDB to search for the requested time series record. Method 400 can further comprise steps of searching for a time series record in the TSDB.

Figure 8:
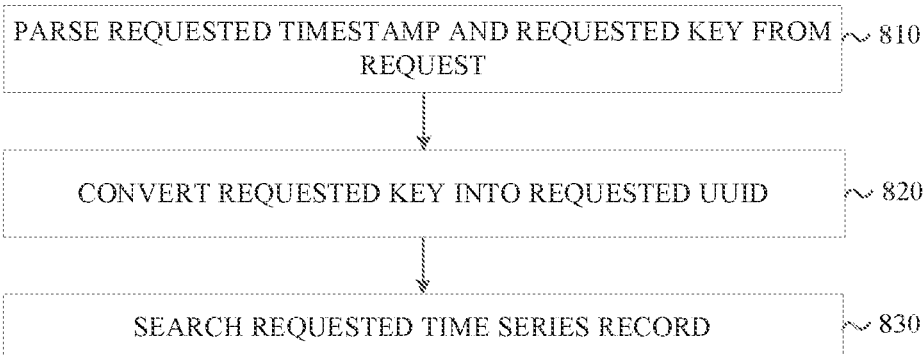
FIG. 8 depicts a process for searching of a time series record in the TSDB according to an embodiment of the present disclosure.

FIG. 8 shows a process 800 of searching for a time series record in the TSDB. At step 810, a requested timestamp and a requested key can be parsed from a request for a time series record. The requested key can comprise a requested metric and a requested label. The parsing of the requested timestamp and the requested key can be implemented by any suitable means for extracting information from a structured or unstructured text. For example, any kind of tokenizer or solution for word segmentation in the natural language processing technology can be used. At step 820, the requested key can be converted into a requested uuid. For example, the same hash function or look-up table as used in step 610 can be used in the conversion from the requested key to the requested uuid. At step 830, the requested time series record can be searched in the TSDB based on the requested uuid and the requested timestamp. As described in step 620, each normalized record can be stored in the TSDB with a uuid, a value and a timestamp. By using the requested uuid and the requested timestamp, a time series record with the same uuid and the same timestamp can be found as the requested record in the TSDB if there is.

Figure 9:
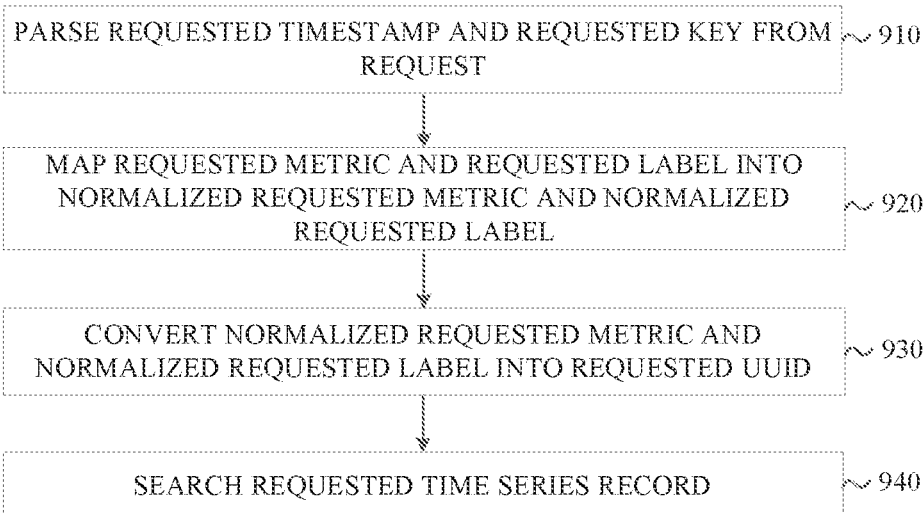
FIG. 9 depicts another process for searching of a time series record in the TSDB according to an embodiment of the present disclosure.

In some circumstances, it may not be able to find a match in the TSDB with a uuid converted directly from the requested metric and label in a request, as the TSDB may only store uuids corresponding to normalized metrics and normalized labels. Therefore, in some embodiments, method 400 can further comprise a process 900 shown in FIG. 9 of searching for a time series record in the TSDB, in which the requested key is mapped into a normalized requested metric and a normalized requested label before converted to a requested uuid. As shown in FIG. 9, at step 910, a requested timestamp and a requested key can be parsed from a request for a time series record. The requested key can comprise a requested metric and a requested label. At step 920, the requested metric and the requested label can be mapped into a normalized requested metric and a normalized requested label based on mapping relationships among metrics and among labels stored in the dictionary. The dictionary used here is the same as those used in step 510. At step 930, the normalized requested metric and the normalized requested label can be converted into a requested uuid. For example, the same hash function or look-up table as used in step 610 can be used in the conversion from the requested key to the requested uuid. At step 940, the requested time series record can be searched in the TSDB based on the requested uuid and the requested timestamp. As described in step 620, each normalized record can be stored in the TSDB with a uuid, a value and a timestamp. By using the requested uuid and the requested timestamp, a time series record with the same uuid and the same timestamp can be found as the requested record in the TSDB if there is.

Figure 10:
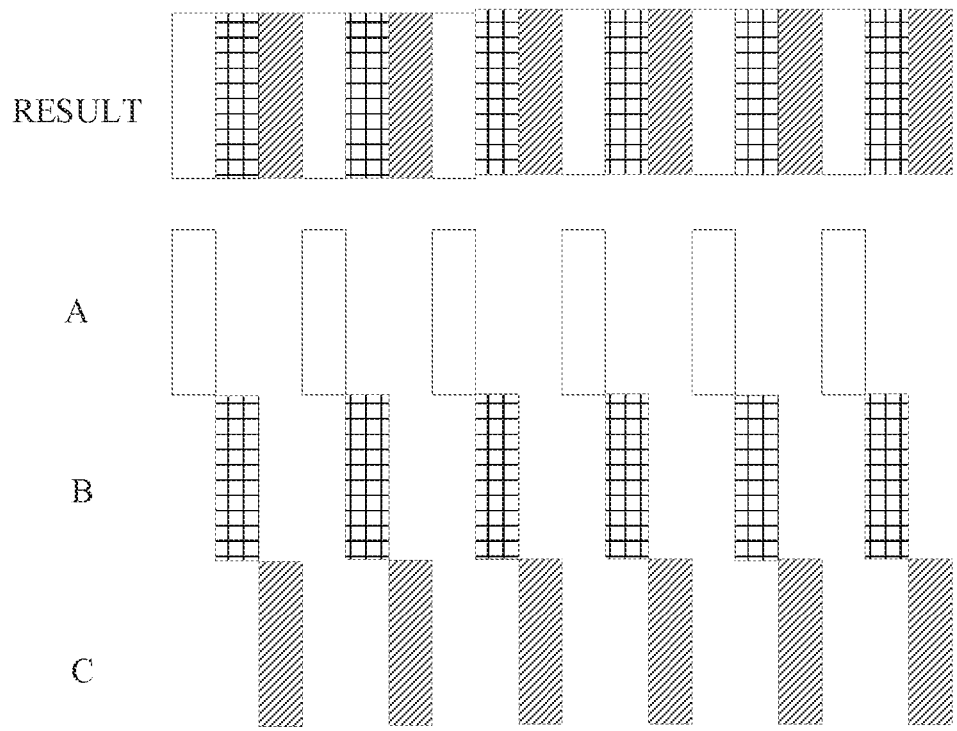
FIG. 10 depicts an illustrative example of a result of a step in a method for record management according to an embodiment of the present disclosure.

In some embodiments, records with the same key (i.e, the same metric and the same label) obtained from different sources may be sampled at different times, and thus those records can be sorted in time sequence to form a record list with more complete data for said metric and label. Therefore, in some embodiments, method 400 can further comprise sorting the normalized records with a same metric and a same label in time sequence based on timestamps of the normalized records. FIG. 10 depicts an illustrative example of a result of the sorting. Normalized records from source A can be records with a series of timestamps of 10:00, 10:03, 10:06, . . . , etc. respectively. Normalized records from source B can be records with a series of timestamps of 10:01, 10:04, 10:07, . . . , etc. respectively. Normalized records from source C can be records with a series of timestamps of 10:02, 10:05, 10:08, . . . , etc. respectively. After the sorting, a record list of records with a series of timestamps of 10:00, 10:01, 10:02, 10:03, 10:04, . . . , etc. can be established. Therefore, auto-filling of data for the same metric and the same label can be achieved. It should be noted that the sorting step can be performed before the storing step 440, or after the searching step 830 or the searching step 940. When the sorting step is performed before the storing step 440, those records with the same key can be stored in a timeline manner. When the sorting step is performed after the searching step 830 or 940, a series of records can be output to the user in time sequence.

In view of the above, embodiments of the present disclosure can enable unification of the naming of the metrics and labels, and can further realize deduplication of records, and/or efficiently store, search and/or sort records. Therefore, embodiments of the present disclosure can provide efficient management of records in the TSDB, improve operation performance of the TSDB, and/or reduce a need for storage space of the TSDB.

Figure 11:
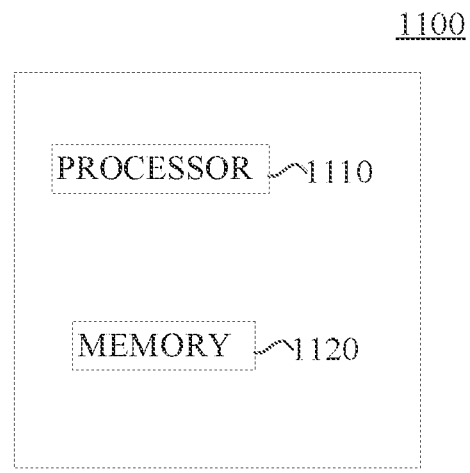
FIG. 11 depicts a system for record management in a TSDB according to another embodiment of the present disclosure.

Referring now to FIG. 11, there is shown a system 1100 for record management in a TSDB according to an embodiment of the present disclosure. The system 1100 can comprise one or more processors 1110 and a memory 1120 coupled to at least one of the processors 1110. A set of computer program instructions are stored in the memory 1120. When executed by at least one of the processors 1110, the set of computer program instructions perform following series of actions for record management in a TSDB. Time series records can be obtained from distributed sources. The records can be divided into different record groups based on a timestamp of each of the records. The records in each of the record groups can be normalized into normalized records. The normalized records can be stored in the TSDB.

In some embodiments, the records can be pulled from the distributed sources and/or the records can be pushed from the distributed sources.

In some embodiments, records with a same timestamp can be grouped into a same record group, records sampled at a same time interval can be grouped into a same record group, or records sampled at time intervals with a multiple relationship can be grouped into a same record group.

In some embodiments, metrics and labels of the records can be mapped to normalized metrics and normalized labels based on mapping relationships among metrics and among labels stored in a dictionary. Values of the records can be adapted based on the mapping of the metrics and the labels.

In some embodiments, the mapping relationships stored in the dictionary comprise predefined mapping relationships.

In some embodiments, the mapping relationships stored in the dictionary can be updated based on trend of values of the records before the normalizing.

In some embodiments, for each of the normalized records, a key of the normalized record can be converted into a universally unique identifier (uuid), wherein the key comprises a metric and a label of the normalized record. The uuid, a value and a timestamp of the normalized record can be stored in the TSDB.

In some embodiments, a mapping relationship between the key and the uuid can be stored in the TSDB.

In some embodiments, only one of the normalized records with a same metric, a same label and a same value can be stored as a shared record.

In some embodiments, a requested timestamp and a requested key comprising a requested metric and a requested label can be parsed from a request for a time series record. The requested key can be converted into a requested uuid. The requested time series record can be searched in the TSDB based on the requested uuid and the requested timestamp.

In some embodiments, a requested timestamp and a requested key comprising a requested metric and a requested label can be parsed from a request for a time series record. The requested metric and the requested label can be mapped into a normalized requested metric and a normalized requested label based on mapping relationships among metrics and among labels stored in a dictionary. The normalized requested metric and the normalized requested label can be converted into a requested uuid. The requested time series record can be searched in the TSDB based on the requested uuid and the requested timestamp.

In some embodiments, the normalized records with a same metric and a same label can be sorted in time sequence based on timestamps of the normalized records.

The descriptions above related to the process of method 400 can be applied to system 1000, details are omitted herein for conciseness.

It should be noted that the processing achieved by the system for record management in a TSDB according to embodiments of the present disclosure could be implemented by computer system/server 12 of FIG. 1.

According to another embodiment of the present disclosure, a computer program product for record management in a TSDB is disclosed. The computer program product comprises a computer readable storage medium having program instructions embodied therewith, and the program instructions are executable by a processor. When executed, the program instructions cause the processor to perform one or more of the above described procedures.

It should also be noted that the terms such as "first" and "second" as used herein are only for the purpose of distinguishing one element from another element without indicating an order and/or importance of the corresponding elements.

The sequence of actions described in connection with the Figures is only exemplary, and cannot be construed as a limitation to the present disclosure. When necessary, the sequence of actions can be modified. In addition, one or more actions can be omitted, and more action can be added.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for record management in a time series database (TSDB), comprising:
    obtaining, by one or more processing units, time series records from distributed sources, wherein the records comprise timestamps, metrics, and labels;
    dividing, by one or more processing units, the records into different record groups based on the timestamp of each of the records;
    normalizing, by one or more processing units, first records from a first group of the record groups into normalized records, wherein normalizing comprises mapping the metrics and labels of the first records to normalized metrics and normalized labels based on mapping relationships stored in a dictionary; and
    storing, by one or more processing units, the normalized records in the TSDB.

2. The computer-implemented method of claim 1, further comprising:
    adapting, by one or more processing units, values of the normalized records based on the mapping of the metrics and the labels.

3. The computer-implemented method of claim 2, wherein the mapping relationships stored in the dictionary comprise predefined mapping relationships.

4. The computer-implemented method of claim 2, further comprises:
    updating the mapping relationships stored in the dictionary based on trend of values of the records.

5. The computer-implemented method of claim 1, wherein the storing the normalized records in the TSDB comprises:
    storing, by one or more processing units, only one of the normalized records with a same metric, a same label and a same value as a shared record.

6. The computer-implemented method of claim 1, further comprises:
    sorting, by one or more processing units, the normalized records with a same metric and a same label in time sequence based on timestamps of the normalized records.

7. The computer-implemented method of claim 1, wherein the dividing the records into different record groups comprises one of the following:
    grouping, by one or more processing units, records with a same timestamp into a same record group;
    grouping, by one or more processing units, records sampled at a same time interval into a same record group; and
    grouping, by one or more processing units, records sampled at time intervals with a multiple relationship into a same record group.

8. The computer-implemented method of claim 1, wherein the storing the normalized records in the TSDB comprises: for each of the normalized records,
  converting, by one or more processing units, a key of the normalized record into a universally unique identifier (uuid), wherein the key comprises a metric and a label of the normalized record; and
  storing, by one or more processing units, the uuid, a value and a timestamp of the normalized record in the TSDB.

9. The computer-implemented method of claim 8, further comprises:
  storing, by one or more processing units, a mapping relationship between the key and the uuid in the TSDB.

10. The computer-implemented method of claim 8, further comprises:
  parsing, by one or more processing units, a requested timestamp and a requested key comprising a requested metric and a requested label from a request for a time series record;
  converting, by one or more processing units, the requested key into a requested uuid; and
  searching, by one or more processing units, the requested time series record in the TSDB based on the requested uuid and the requested timestamp.

11. The computer-implemented method of claim 8, further comprises:
  parsing, by one or more processing units, a requested timestamp and a requested key comprising a requested metric and a requested label from a request for a time series record;
  mapping, by one or more processing units, the requested metric and the requested label into a normalized requested metric and a normalized requested label based on mapping relationships among metrics and among labels stored in a dictionary;
  converting, by one or more processing units, the normalized requested metric and the normalized requested label into a requested uuid; and
  searching, by one or more processing units, the requested time series record in the TSDB based on the requested uuid and the requested timestamp.

12. The computer-implemented method of claim 1, wherein the obtaining the records from distributed sources comprises at least one of the following:
  pulling, by one or more processing units, the records from the distributed sources; and
  getting, by one or more processing units, the records pushed from the distributed sources.

13. A system for record management in a time series database (TSDB), comprising:
  one or more processors;
  a memory coupled to at least one of the processors;
  a set of computer program instructions stored in the memory, which, when executed by at least one of the processors, perform actions of:
    obtaining time series records from distributed sources, wherein the records comprise timestamps, metrics, and labels;
    dividing the records into different record groups based on the timestamp of each of the records;
    normalizing first records from a first group of the record groups into normalized records, wherein normalizing comprises mapping the metrics and labels of the first records to normalized metrics and normalized labels based on mapping relationships stored in a dictionary; and
    storing the normalized records in the TSDB.

14. The system of claim 13, further comprising:
  adapting values of the normalized records based on the mapping of the metrics and the labels.

15. The system of claim 14, wherein the set of computer program instructions perform actions of:
  updating the mapping relationships stored in the dictionary based on trend of values of the records.

16. The system of claim 13, wherein the storing the normalized records in the TSDB comprises:
  storing only one of the normalized records with a same metric, a same label and a same value as a shared record.

17. The system of claim 13, wherein the set of computer program instructions further perform actions of:
  sorting the normalized records with a same metric and a same label in time sequence based on timestamps of the normalized records.

18. The system of claim 13, wherein the dividing the records into different record groups comprises one of the following:
  grouping records with a same timestamp into a same record group;
  grouping records sampled at a same time interval into a same record group; and
  grouping records sampled at time intervals with a multiple relationship into a same record group.

19. The system of claim 13, wherein the storing the normalized records in the TSDB comprises: for each of the normalized records,
  converting a key of the normalized record into a universally unique identifier (uuid), wherein the key comprises a metric and a label of the normalized record; and
  storing the uuid, a value and a timestamp of the normalized record in the TSDB.

20. A computer program product for record management in a time series database (TSDB), the computer program product comprising a computer readable storage medium having program instructions embodied therewith, the program instructions executable by a processor to cause the processor to:
  obtain time series records from distributed sources, wherein the records comprise timestamps, metrics, and labels;
  divide the records into different record groups based on a timestamp of each of the records;
  normalize first records from a first group of the record groups into normalized records, wherein normalizing comprises mapping the metrics and labels of the first records to normalized metrics and normalized labels based on mapping relationships stored in a dictionary; and
  store the normalized records in the TSDB.

* * * * *